M. G. NUÑEZ.
FIXED VERNIER.
APPLICATION FILED JULY 28, 1908.

977,537.

Patented Dec. 6, 1910.

WITNESSES:

INVENTOR:

UNITED STATES PATENT OFFICE.

MANUEL GARCIA NUÑEZ, OF MADRID, SPAIN.

FIXED VERNIER.

977,537.  Specification of Letters Patent.  Patented Dec. 6, 1910.

Application filed July 28, 1908. Serial No. 445,839.

*To all whom it may concern:*

Be it known that I, MANUEL GARCIA NUÑEZ, a subject of the King of Spain, residing at Madrid, Spain, have invented a new and useful Fixed Vernier, of which the following is a specification.

My invention relates to a scale for taking circular or linear measurements, and particularly to a vernier used in conjunction therewith to ascertain fractions of the smallest divisions of the said scale.

My invention has for its object to so arrange the vernier with respect to the scale that the vernier occupies a fixed position with respect to the latter, instead of being movable as heretofore.

In order to better explain my invention, reference is had to the accompanying drawing in which—

Figure 1:
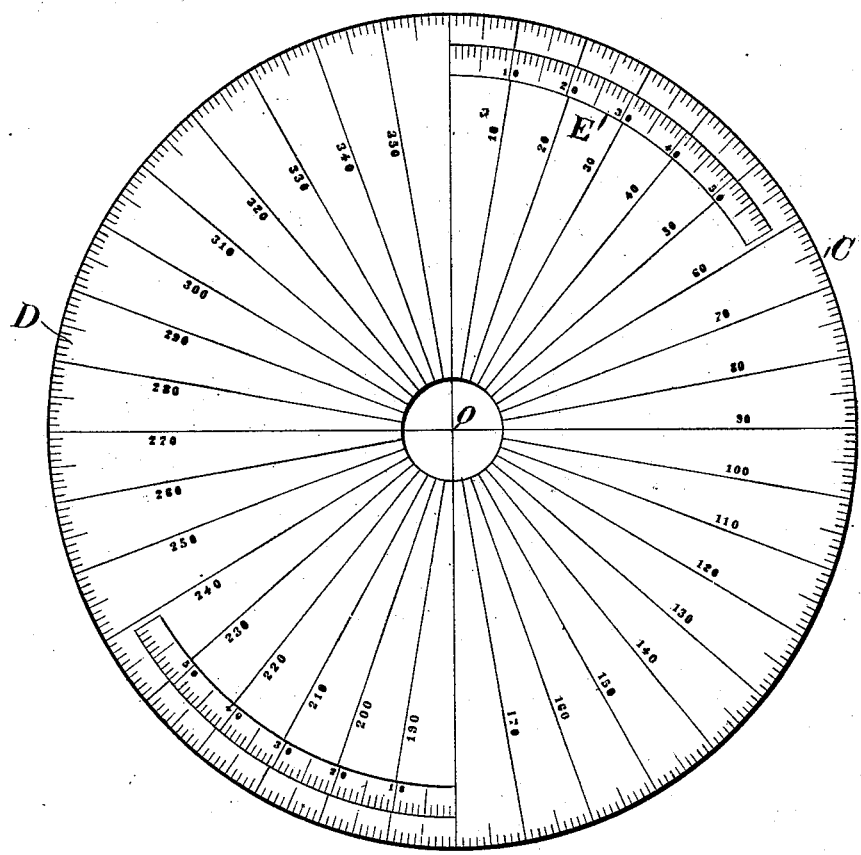
Figure 2:
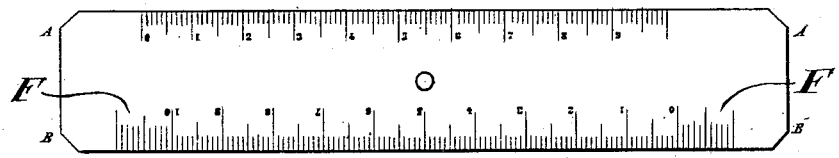

Figure 1 illustrates the vernier as applied to a protractor; Fig. 2 illustrates a vernier as applied to a scale for taking linear measurements.

Referring first to Fig. 1, C designates a circular disk of any suitable material, the circumference of which is divided into 360 degrees, forming the scale D. A second scale E, concentric with the scale D, but extending only over a distance corresponding to 59° of the scale D is arranged on the said circular disk in a fixed position. The scale E, is divided into sixty equal divisions each of said divisions being of a value of 59', i. e. 1' less than the divisions of the scale D.

In Fig. 2, the scale B, is divided into millimeters and has a total length of 100 millimeters. An auxiliary scale or vernier F, extends upon each side of the scale B and has a length of 11 millimeters. These auxiliary scales F, are divided each into ten equal parts, each of said parts therefore being equal to 1-1/10 millimeters. The auxiliary scale on the right hand side of the scale B, is not indispensable, but is added simply for convenience to avoid reversing the rule in taking measurements from right to left.

The upper scale A, in Fig. 2, is divided into ten parts, the first being divided into ten millimeters. The first division of the second part has a value of 1-1/10 millimeters, the remaining nine divisions of said second part being millimeters. The first division of the third part has a value of 1-2/10 millimeters, the remaining nine divisions being millimeters. This division is continued to the end of the scale A, the first division of each successive part increasing progressively by 1/10 of a millimeter, so that the first division of the last part will have a value of 1-9/10 millimeters. The various values of the corresponding first divisions of the different parts can be readily obtained from the numbers placed at the beginning of the different parts. Thus, for example in the part marked 5, the first division has a value of 1-5/10 millimeters.

In applying the scales D and E (see Fig. 1) to the measurement of a given angle which one line of plane makes with another line, or to determine the position of a line in a plane making a given angle with another line in said plane, the following operations are necessary. If it is desired, for instance, to determine the position of a line which will make an angle of 43° and 32′ with another line, in that case the number 32 expressing the minutes must be added to the number 43 expressing the degrees, the sum being 75. The protractor is then placed on the plane so that its center O, coincides with the vertex of the angle to be determined. The division 32 on scale E, is made to coincide with the second line of the angle, and the first mentioned line of said angle will then pass through the division 75 on scale D and the vertex O. To prove that this angle is correct, it should be noted that if the scale E were divided into complete degrees as the scale D is, and the division 32 were made to coincide with the second line of the angle, as set forth, the zero of scale D, would have been receded 32°, and on drawing the first mentioned line through the division 75 of the scale D, and the vertex O, the angle so formed would have been equal to 43°. As the divisions of scale E, however, are each 1′ less than the divisions of scale D, i. e., of a value of 59°, receding the scale E 32 divisions, the scale D is receded less than 43° by the amount of the difference in the value of the division of the scale D, multiplied by the number of divisions the scale has been moved, viz., 32 times 1′, or 32′, which added to the 43° makes the angle 43° and 32′.

In measuring the angle the two planes form with each other the center O of the protractor is made to coincide with the vertex of the angle and the protractor is moved around, until a division of the scale E coincides with one side of the angle, while a division of the scale D, simultaneously coincides with the other side of the angle. The value of the angle in degrees will be the reading of the scale D, less the reading of the scale E, and in minutes the reading of the said scale E.

As regards the taking of linear measurements with the scale B, there are two problems presented, viz., to draw in a plane a line of a given length, and, to measure the length of a line drawn on a plane. In the first case, assuming that it is desired to draw a line having a length of 24-6/10 millimeters, to this end the number expressing the tenth of a millimeter is subtracted from the number which expresses millimeters:

$$24-6=18$$

The sixth division of the adjacent or auxiliary scale F is then placed to coincide with the original point of the line, and measuring 18 divisions of the scale B, from this line, the desired length will be obtained, as each of the 6 divisions of the auxiliary scale F, has a value of 1-1/10 millimeters, the six divisions thereby, adding to the 18 millimeters 6-6/10 millimeters, making a total length of 24-6/10 millimeters.

In the second problem, in order to determine the length of a given line, the adjacent or auxiliary scale F, is moved, until one of its divisions coincides with one end of the line, while the other end of said line coincides with the division of scale B. The length of the line will then be equal to as many tenths of a millimeter as divisions have been taken in the auxiliary scale F, and in millimeters to as many as indicated on scale B, plus the number of the divisions of scale F, i. e., equal to the number of tenths.

The system, as explained, is applicable to the measurement of straight lines and arcs, with the consequent adaptations that are necessitated by the difference in linear and angular magnitudes. This difference makes the addition of the auxiliary scale A (Fig. 2) necessary for straight lines, since by the scale B, lengths of certain lines can not be determined in some cases with only one position of the rule. These cases are those in which a number expressing the decimal fraction is greater than the whole part, for example 3-9/10, 3-8/10, 4-8/10 &c. For these cases the scale A is employed.

In considering the scale A independently of scale B, the scale A consists of ten separate parts of 10—10.1—10.2—10.3 . . . 10.9 millimeters. Each part is divided into millimeters, but in the first division of each one is included 1—2—3 . . . 9 tenths of a millimeter more, conforming with the indication of the numbers marked at the foot of these divisions. Therefore, with the portion corresponding to the No. 1 it is possible to take the lengths: 1-1/10, 2-1/10, 3-1/10, 4-1/10, &c., millimeters, and with that corresponding to the No. 2, the following: 1-2/10, 2-2/10, 3-2/10, 4-2/10, &c., millimeters, and so forth till with the last portion one is enabled to make the lengths: 1-9/10, 2-9/10, 3-9/10, 4-9/10, &c., millimeters. Therefore, with the scale A, it is possible to take with the approximation of 1/10 of a millimeter any length between one and ten millimeters, and use said scale as an auxiliary of scale B, and besides shorten the operation when lengths not exceeding two millimeters are dealt with.

I claim:

A measuring instrument comprising a suitable scale and a fixed auxiliary vernier co-acting with said scale, thereby dispensing with the usual sliding auxiliary vernier.

In testimony whereof I have signed my name to this specification in the presence of two subscribing witnesses.

MANUEL GARCIA NUÑEZ.

Witnesses:
  LORENZO ORTIZ É TRIBAS,
  JOAQUIN LOPES ALVENES.